(12) United States Patent
Rojewski

(10) Patent No.: US 7,581,245 B2
(45) Date of Patent: Aug. 25, 2009

(54) TECHNIQUE FOR EVALUATING COMPUTER SYSTEM PASSWORDS

(75) Inventor: Erwin Rojewski, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1083 days.

(21) Appl. No.: 11/049,185

(22) Filed: Feb. 2, 2005

(65) Prior Publication Data

US 2005/0198537 A1   Sep. 8, 2005

Related U.S. Application Data

(60) Provisional application No. 60/550,542, filed on Mar. 5, 2004.

(51) Int. Cl.
*G06K 9/00* (2006.01)
(52) U.S. Cl. ............................................. 726/6; 726/18
(58) Field of Classification Search ...................... 726/6, 726/18
See application file for complete search history.

(56) References Cited

U.S. PATENT DOCUMENTS 5,394,471 A   2/1995   Ganesan et al.
5,944,825 A   8/1999   Bellemore et al.
2003/0140258 A1   7/2003   Nelson et al.

OTHER PUBLICATIONS

Bishop, M., et al. "Improving System Security Via Proactive Password Checking," *Computers & Security*, vol. 14, No. 3, 1995, pp. 233-249, XP004002020.
Spafford, E.H., "Preventing Weak Password Choices," *Perdue Technical Report*, CSD-TR-91-28, XX, XX, Mar. 1, 1991, pp. 1-10, XP000513986.

*Primary Examiner*—Jacob Lipman
(74) *Attorney, Agent, or Firm*—Buckley, Maschoff & Talwalkar LLC

(57) ABSTRACT

A technique for evaluating computer system passwords is disclosed. The technique commences with obtaining, for each user of a computer system, password information generated by performing a security procedure on a password entry. The technique sequentially performs, for each user name, the security procedure on sequenced entries of a dictionary until either a match with the password information is detected or the sequenced entries are exhausted. The technique adjusts the sequence of a sequenced entry in the dictionary based on the number of matches detected for the sequenced entry, so that analysis of subsequent computer system password lists more rapidly identify passwords that may present a security risk to the computer system.

20 Claims, 4 Drawing Sheets

TECHNIQUE FOR EVALUATING COMPUTER SYSTEM PASSWORDS

CROSS-REFERENCE TO RELATED APPLICATION

This application claims priority from U.S. Provisional Application Ser. No. 60/550,542, filed Mar. 5, 2004, the contents of which are incorporated herein by reference.

TECHNICAL FIELD

The invention relates to communications. More specifically, the invention relates to a technique for use with a system accessible via a computer network that determines whether assigned or selected passwords are susceptible to unauthorized access.

BACKGROUND OF THE INVENTION

In-house computer systems, such as those used in connection with enterprise software, are typically accessible via one or more passwords by a plurality of users via a computer network. These passwords may be unique to each individual user, or they may be shared among several users. Increasingly, companies are making their computer systems available via the Internet so that users may access them from various locations. While this arrangement may increase productivity, it also makes the computer system more vulnerable to unauthorized attempts to access the system (such as through "hackers").

Users, when prompted to generate their own passwords, often select a password that is easy to remember. Such passwords may be duplicative of those the users have at other computer systems (including websites), or they may include terms such as commonly found terms within a dictionary, variations on their names, family names, their pets' names, birthday, favorite hobby, favorite movie actor, etc. If a user selects a passwords based on any of these subjects, then such password may be more vulnerable to unauthorized access. This vulnerability makes the account more susceptible to hacker attack where a common technique is to attempt to login into accounts by cycling through a list of entries in a password dictionary until a match is found.

As increasing amounts of proprietary data are being generated via computer networks, prudent business practices require that safeguards be implemented to prevent or reduce the likelihood of unauthorized access. Although simple safeguards are often implemented, such as freezing access to an account after three unsuccessful attempts to login (which can be useful in repelling brute-force hacker attacks), organizations often overlook the risks posed by the passwords chosen by their various computer system users. Conventional techniques for determining whether a password is safe at a system level include simulating a dictionary attack by comparing each password to a fixed sequence of entries within a dictionary to determine if a match occurs. However, processing times and associated computing resources required for such simulated dictionary attacks often make frequent password security checks unfeasible.

SUMMARY OF THE INVENTION

Embodiments of the invention may provide a more efficient technique, utilizing fewer computing resources and minimizing data traffic, for identifying passwords that are weak or otherwise vulnerable to duplication and use by unauthorized entities. Embodiments of the invention may provide an improved technique for generating a password dictionary.

In a first general aspect, the invention may be embodied in a system for evaluating passwords for a plurality of users of a computer system. The system includes a computer system including a login database for storing a user name and corresponding password information for each of a plurality of users, the password information being generated by performing a security procedure on a password entry. The computer system includes a first data acquisition interface for receiving the user name and the password entry from the plurality of users, and a security module coupled to the login database and the first data acquisition interface for performing the security procedure on the received password entry and providing access to the computer system if the generated password information matches the password information in the login database. The system also includes a password evaluation component which comprises a second data acquisition interface for obtaining the password for each user of the computer system, a database including a dictionary having sequenced entries, and an analysis module coupled to the second data acquisition interface and the database for sequentially performing, for each user, the security procedure on the sequenced entries until either a match with the user's password information is detected or the sequenced entries are exhausted. The password evaluation component stores in the database, for each of the sequenced entries, data associated with the number of matches detected for the sequenced entry, and adjusts the sequence of entries in the dictionary based on the number of matches detected for each sequenced entry.

The analysis module may further determine that a password entry is not secure based on whether a match with the user's password information is detected and the number of matches detected for the sequenced entry. Furthermore, the analysis module may make this determination provided that the number of detected matches is above a predetermined sequence threshold. For example, unless there are more than X number or Y percentage of matches corresponding to a password, then the analysis module determines that the password is secure.

The password evaluation component may further comprise a pre-screening module for comparing the password information of the plurality of users to determine if there is at least one duplicate and for excluding the at least one duplicate from the sequential performance of the security procedure by the analysis module. This pre-screening module may further increase the efficiency of the system by removing passwords that are, on their face, not secure. In addition, the pre-screening module may incorporate other criteria such as passwords solely using letters or numbers to exclude password information.

The sequence of entries in the dictionary may be adjusted by ranking the sequenced entries based on the number of historical (or for some pre-defined period of time) detected matches corresponding to each such sequenced entry. Optionally, the ranking may only take into account those sequenced entries that have a number of matches that exceeds a predetermined threshold. For example, the ranking may exclude those entries that do not have more than ten matches associated therewith.

The password evaluation component may further comprise an accounting unit, coupled to the password evaluation component for calculating the number of matched passwords, and generating an invoice based on the number of matched passwords. Alternatively, the accounting unit may generate an invoice solely based on the total number of analyzed passwords.

In a second general aspect, the invention may be embodied in a method for evaluating computer system passwords. The method includes obtaining, for each user of a computer system, password information generated by performing a security procedure on a password entry. The method comprises sequentially performing, for each user, a security procedure on sequenced entries of a dictionary until either a match with the password information is detected or the sequenced entries are exhausted. Based on the number of matches detected for the sequenced entry, the sequence of a sequenced entry in the dictionary is adjusted.

In some embodiments, the method repeats the steps for a plurality of computer systems (with the dictionary being adjusted after each set of analyses). Therefore, in some arrangements, iterations through each password information commences with those sequenced entries that most often correspond to the password information, which often results in fewer iterations until a match is detected (and thus more efficient and rapid detection of weak passwords).

The method may also determine whether a password is not secure, weak, or otherwise poses a security risk for the client system. This determination may be based on whether a match with the password information is detected. In some variations, the password may be determined to not be secure if the match with the password information is detected and the sequenced entry corresponding to the password information is above a predetermined sequence threshold in the dictionary (e.g., within the first 20,000 entries within the dictionary).

The entries within the dictionary may be adjusted by ranking them based on the number of detected matches corresponding thereto, or in the alternative, by ranking only those entries having a certain number of historical matches (e.g., a total of 10 matches or more).

Depending on the implementation, the method may also include pre-processing steps to filter any passwords that are, on their face, weak. For example, the method may compare several instances of password information to determine if there are any duplicates, and exclude the duplicates from the step of sequentially performing the security procedure. This may avoid unnecessary iterations (and use of computing resources). The method may also exclude those passwords that appear to refer to dates, names, and other types of passwords that have easily identifiable formats.

The method may comprise the step of populating the dictionary with terms selected from the group comprising user/account names, background information pertaining to users, character sequences, numbers, foreign language words, names of places, common last names, common male and female first names, uncommon first names, characters in myths and legends, Shakespearean references, sports terms, science fiction terms, movies and actors, cartoons, celebrities, phrases and patterns, biological terms, machine names, religious references, mnemonics, celestial objects, as well as any other class of terms of phrases that might be commonly used by account users (as well as hackers). The dictionary entries may be stored in a database, and in that case, the method may also include the step of obtaining the dictionary entries from a database.

The methods of the current invention may also be utilized in connection with a fee-for-service analysis of the passwords of a computer system. The method may then also comprise calculating the number of password entries for which matches have been detected, and generating (and optionally sending) an invoice based on the calculated number of password entries (or percentage of matched passwords). Alternatively, pricing may simply be based on the number of analyzed passwords.

The invention may be embodied in a computer program product, tangibly embodied in an information carrier, that comprises instructions for a processor to perform any of the above described method steps.

In a third general aspect, the invention provides an apparatus for evaluating computer system passwords. The apparatus comprises an acquisition unit obtaining, for each user of a computer system, password information generated by performing a security procedure on a password entry. The apparatus comprises an analysis unit sequentially performing, for each user, the security procedure on sequenced entries of a dictionary until either a match with the password information is detected or the sequenced entries are exhausted. The apparatus comprises a modification unit adjusting the sequence of a sequenced entry in the dictionary based on the number of matches detected for the sequenced entry.

BRIEF DESCRIPTION OF THE DRAWINGS

Further details, embodiments, modifications and enhancements of the present invention may be obtained from consideration of the following description of various illustrative embodiments of the invention in conjunction with the drawings, in which.

DETAILED DESCRIPTION OF PREFERRED EMBODIMENTS

In the following description, for purposes of explanation and not limitation, specific details are set forth, such as particular sequences of steps and various configurations, etc. in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product as well as a system comprising a computer processor and a memory coupled to the processor, where the memory is encoded with one or more programs that may perform the methods disclosed herein.

Figure 1:
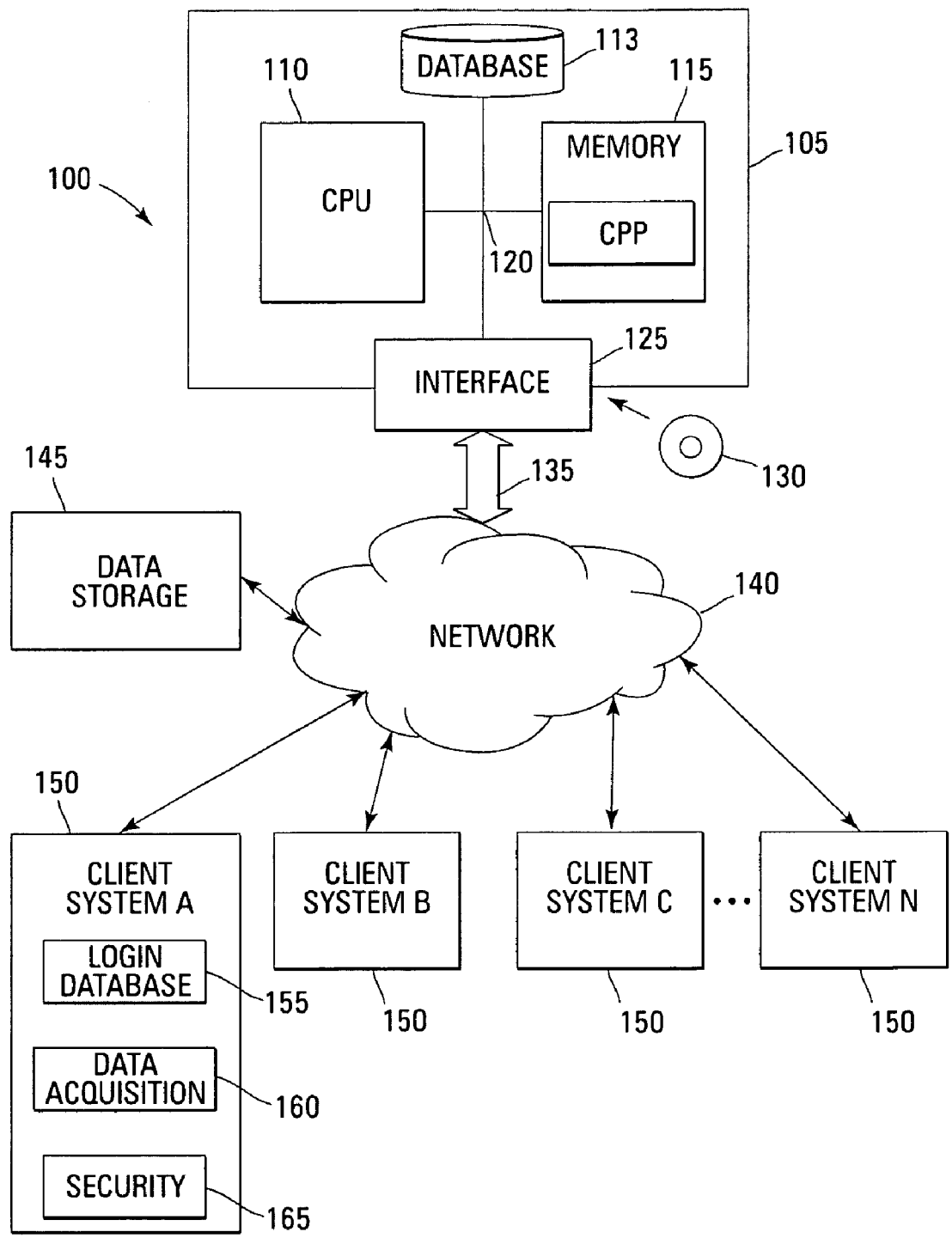
FIG. 1 is a schematic diagram illustrating a data processing system used in accordance with the present invention.

With reference to FIG. 1, a computer network system 100 that may be used to implement and practice the current invention is illustrated. The computer network system 100 comprises a network component 105 having a processor 110, a database 113 for storing data such as dictionary entries, a memory 115, a bus 120, and an interface 125, interoperating in a conventionally known manner. The network component 105 may be coupled to a computer network 140 to provide it access to a data storage unit 145 (which may house one or more databases) and a plurality of client systems 150 (each of which may be similarly configured). The present invention may be embodied in a computer program product (hereinafter CPP) residing on a program carrier 130 and/or in the memory 115, and generating program signals 135, collectively called a "program".

The network component 105 can be, for example, a conventional personal computer (PC), a desktop or a hand-held device, a multiprocessor computer, a microprocessor-based or programmable consumer electronics device, a minicomputer, a mainframe computer, a personal mobile computing device, a mobile communications device, a portable or stationary personal computer, a palmtop computer or the like.

The processor 110 can be, for example, a central processing unit (CPU), a micro-controller unit (MCU), digital signal processor (DSP), or the like. The memory 115 symbolizes elements or components that can temporarily or permanently store data and instructions. Although the memory 115 is conveniently illustrated as a part of the network component 105, a memory function can also be implemented as an independent node in the network 140, in the other components of the network, in the processor 110 itself (e.g., cache, register), or elsewhere.

The memory 115 can be a read only memory (ROM), a random access memory (RAM), or a memory with other access options or capabilities. The memory 115 may be physically implemented as machine-accessible media, such as a magnetic media (like a hard disk, a floppy disk, or other magnetic disk, or a tape), an optical media (like an optical disk, e.g. a CD-ROM or a digital versatile disk—DVD), a semiconductor media (like DRAM, SRAM, EPROM, EEPROM, or a memory stick), or by any other media. Optionally, the memory 115 is distributed across different media. Portions of the memory 115 can be removable or non-removable with respect to a particular network component. For reading from media and for writing into media, the network component 105 uses devices well known in the art such as, for example, disk drives, tape drives, memory card or memory stick reader/writers, etc.

The memory 115 can store software program support modules such as, for example, a basic input output system (BIOS), an operating system (OS), a program library, a compiler, an interpreter, communication programs, drivers, protocol converters, application software programs like text processors, (Internet-) browsers, or database applications. Although the CPP is illustrated as being stored in memory 115, the CPP can also be located elsewhere. For example, the CPP can also be embodied on the program carrier 130.

The CPP comprises program instructions and, optionally, data or variables that cause processor 110 to execute the steps forming the methodology of the present invention. The method steps are explained in greater detail below. The CPP defines and controls the operation of the network component 105 and its interaction in the network 140. For example, and without the intention to be limiting, the CPP can be available as source code in any programming language, and as object code ("binary code") in a compiled presentation. Persons of ordinary skill in the art can use the CPP in connection with any of the above mentioned support modules.

The program carrier 130 is illustrated as being outside the network component 105. For communicating the CPP to the network component 105, the program carrier 130 is conveniently inserted into the interface 125. The carrier 130 is implemented as any computer readable medium, such as one of the media explained above (cf. memory 115). Generally, the program carrier 130 is an article of manufacture comprising a computer readable medium having computer readable program code means embodied therein for executing the method of the present invention. Further, the program signals 135 can also embody the CPP. The signals 135 travel on the network 140 to and from the network component 105. The steps of the computer program product CPP can be executed solely in the network component 105, in which case the computer network 140 may be omitted, or can be executed in a distributed manner in one or more of the components of the computer network 140.

The interface 125 may include a device that provides data and instructions for being processed by the network component 105. For example, the interface 125 may include a keyboard, a pointing device (e.g., a mouse, a trackball, cursor direction keys), a microphone, a joystick, a game pad, a scanner, etc. While these examples are devices requiring human interaction, the interface 125 can also operate without human interaction, such as a wireless receiver (e.g., with satellite dish or terrestrial antenna), a sensor, a counter (e.g., goods counter in a factory), etc. The interface 125 can also serve to retrieve the program code of the CPP from the program carrier 130. The interface 125 may also include a device that presents instructions and data that have been processed. It can be, for example, a monitor or display (such as a cathode ray tube, a flat panel display, or a liquid crystal display), a speaker, a printer, a plotter, a vibration alert device, etc.

The bus 120 and the network 140 provide logical and physical connections by conveying instructions and data signals. While connections and communications inside the network component 105 are conveniently handled by the bus 120, connections and communications between different network components are handled by the network 140. Optionally, the network 140 comprises gateways and routers being computers that are dedicatedly programmed to effect data transmission and protocol conversion.

The interface 125 is coupled to the network component 105 by the bus 120 (as illustrated) or by the network 140 (optional). While the signals inside the network component 105 can be mostly electrical signals, the signals in the network can be electrical, magnetic, optical or wireless (radio) signals.

The network 140 can include one or more of an office-wide computer network, an enterprise-wide computer network, an intranet or the Internet (i.e., world wide web). The world wide web (www) represents all of the computers on the Internet that offer users access to information on the Internet via interactive documents or Web pages. Web information resides on Web servers on the Internet or within company or community networks (intranets). Network 140 can include a wired or a wireless network, such as, for example, a local area network (LAN), a wide area network (WAN), a wireless LAN (WLAN), a public switched telephone network (PSTN), an integrated services digital network (ISDN), an infra-red (IR) or Bluetooth link, a radio link e.g. according to the Universal Mobile Telecommunications System (UMTS), the Global System for Mobile Communication (GSM), a Code Division Multiple Access (CDMA) system, or satellite link.

Transmission protocols, mechanisms and data formats to effect communications between network components which are connected to and by the network 140 are known, for example, as transmission control protocol/internet protocol (TCP/IP), hyper text transfer protocol (HTTP), secure HTTP, wireless application protocol (WAP), unique resource locator (URL), unique resource identifier (URI), hyper text markup language HTML, extensible markup language (XML), extensible hyper text markup language (XHTML), wireless application markup language (WML), electronic data interchange (EDI), which is an electronic exchange of business information between or inside organizations and their information technology (IT) infrastructure in a structured format, remote function call (RFC), or via an application programming interface (API), etc.

Interfaces (whether wired or wireless) coupled between individual elements and components are also well known in the art. For simplicity, interfaces are not illustrated. An interface can be, for example, a serial port interface, a parallel port interface, a game port, a universal serial bus (USB) interface, an internal or external modem, a video adapter, or a sound card.

The software and the hardware infrastructure of an embodiment of the invention utilize the network component 105 and an interface 125 having a graphical display unit and an input unit such as a mouse or a trackball. The network component 105 is connected to a wide area network (WAN) 140, for operating in an intranet and for providing access to the Internet to which the client systems 150 are also connected.

The CPP according to the present invention can be part of a complex software system embedded in a hardware structure. The cooperation of the software system and the hardware structure is sometimes referred to as the IT backbone system. The backbone system can have a layered structure with individual software components acting as service providers, service requesters, or both. For example, application software can include software components that provide services for presentation, acting as a server. But at the same time, the application software also can act as service requester of database services provided by a lower layer. The layered components can communicate with each other via predefined (hardware and software) interfaces.

With regard to a possible implementation of a layered software structure, a lower layer may include network-related functionalities, a physical database and an operating system for the network components. A middle layer that interfaces with the lower layer integrates software applications in the upper layer above it. This middle layer may include components like software tools, system administration tools, data handling tools, authorization and security management tools, cross-application modules, and a system kernel. The system kernel can use communications and application program interfaces to access components like application software in the upper layer or the operating system, the database, and the network in the lower layer. This system kernel can operate independently from the applications and is located "under" the application software and the data layers of the software system. The upper layer contains the different software applications for determining whether passwords are vulnerable to unauthorized usage, etc.

Each of the client systems 150 includes a login database 155 that is used in verifying the identity of users seeking access to the system. The system prompts every new user to enter a password. The system does not store the password entry in plain text. Rather, the system performs a security procedure on the password entry, thereby generating password information that the system stores in the login database 155. The password information is essentially uniquely related to the password entry, yet the password entry cannot be deduced from the password information. Upon a user entering a password for system access, the system performs the security procedure on the entered password and compares the result with the stored password information for that user. If they are the same, the system grants the user access. Information entered by the user may be received using a data acquisition interface 160. The security procedure may be performed by a security module 165. The security module 165 is coupled to the login database 155 and the data acquisition interface 160.

In some implementations, the security procedure is a hashing procedure. Also, the user name may be included when the system performs the hashing procedure to generate the password information. That is, upon registering a new user, the system receives the user name and the user's selected password entry, adds them together, and performs the hashing procedure on the cumulative information. The resulting password information may be referred to as a hashed password entry. Accordingly, the login database 155 may store the user name and the corresponding hashed password entry for each of a plurality of users. Upon a user seeking access, the security module 160 may hash the received user name and password into a hashed password entry and provide access to the client system if the hashed password entry matches the hashed password entry within the login database 155. In other aspects, the client systems 150 are arranged in conventional manners for systems that are accessible by a plurality of users via a computer network, such as the Internet, and where a user provides an identification entry and a security entry (or entries) to access the client system.

Figure 2:
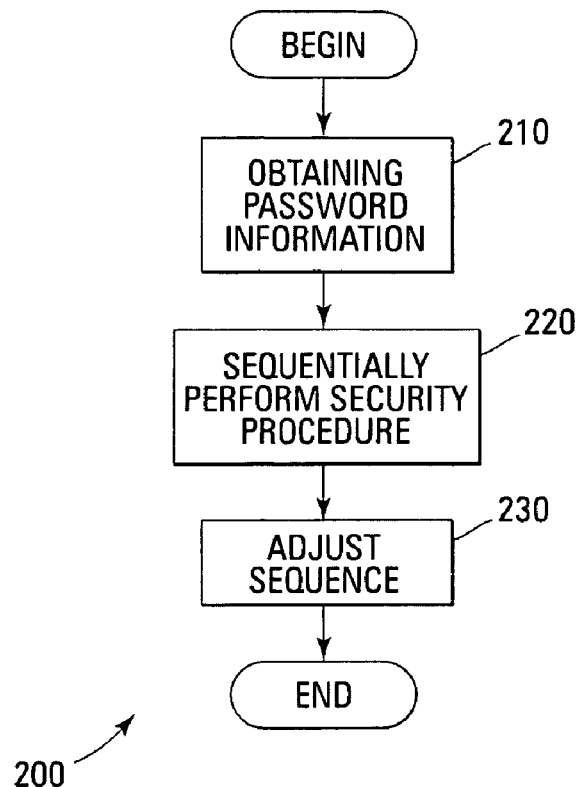
FIG. 2 is a process flow diagram illustrating a method embodiment of the current invention.

FIG. 2 is a process flow diagram illustrating a method embodiment 200 according to the current invention for evaluating computer system passwords. The method commences (which may be implemented using a device such as network component 105 in FIG. 1), at step 210, with obtaining password information for each user of a client system (such as the client systems 150 in FIG. 1). The password information has been generated by performing a security procedure on a password entry. After this data has been acquired, at step 220, the method continues with sequentially performing, for each user name, the security procedure on sequenced entries of a dictionary until either a match with the password information is detected or the sequenced entries are exhausted. In other words, the method uses the same security procedure for each of the series of password entries as it did when generating the password information. At step 230, the sequence of a sequenced entry is adjusted based on the number of matches detected for the sequenced entry. Further details and examples useful for understanding and implementing the invention are provided below.

Figure 3:
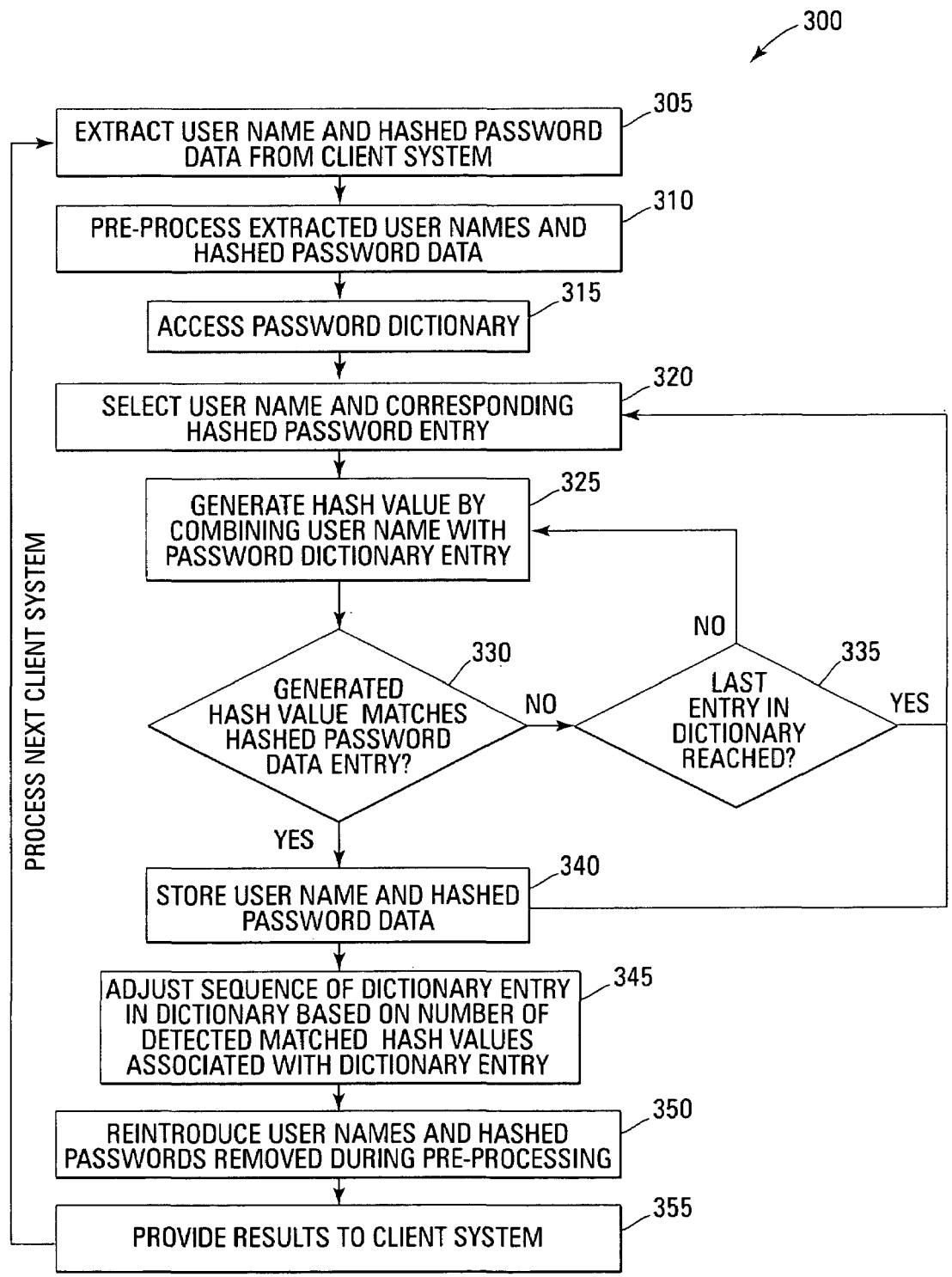
FIG. 3 is a process flow diagram of an example useful for understanding and implementing the invention.

FIG. 3 illustrates a sample process 300 that may be used, in some variations, with the current invention. The process 300 uses a hashing procedure to generate the hashed password data and also includes the user name in the hashing, similarly to the example described above. In other implementations, the process 300 can be used with another security procedure or may omit the user name upon generating the password information.

At step 305, user name and hashed password entries corresponding to each user name are extracted from a client system. The hashed password entries are encrypted and are based on both the user name and the corresponding password generated by either the user or the client system (when the account for the user name was generated)—so that hashing dictionary entries alone would not be sufficient to determine if a match exists. Next, at step 310, the user names and hashed password entries are pre-processed to identify and segregate those user names and hashed passwords that are prima facie weak. For example, the method may detect duplicates in user password pairs (or may filter out passwords that are based on user background information that may be separately provided), store such duplicate information, and then segregate or otherwise remove such user names with their hashed passwords from the steps relating to the generation of hashed values.

A password dictionary is accessed (e.g., loaded from a database such as an internal database 113 or from data storage unit 145 in FIG. 1) at step 315, whereafter, at step 320, a user name and its corresponding hashed password entry are selected. This selection may be simply based on the order in which the user name data was provided, or it can be conducted in another manner (such as alphabetical order, access levels for such accounts, etc.). At step 325, the combination of the selected user name and a first entry within the password dictionary, is encrypted (or otherwise modified) to generate a hashed value.

Once the hashed value has been generated it is determined, at step 330, whether the hashed value matches the hashed password entry for the selected user name. If the hashed value does not match, then it is determined, at step 335, whether there are any remaining entries in the dictionary. If the last entry has not been reached, then, at step 325, a hashed value is generated based on the user name and the next subsequent entry in the password dictionary. Otherwise, at step 320, a new user name and corresponding hashed password entry are selected. As is illustrated, this process repeats until the user names are exhausted. For each match, at step 330, the user name and hashed password data, at step 340, are stored.

Once all of the matches are collected, stored, or tallied, at step 345, the sequence of dictionary entries is adjusted based on the number of detected matched hashed values. For example, the dictionary entries may be ranked in order of most frequently detected (having the lowest sequence number) to least frequently detected (having the highest sequence number). Or in the alternative, only those dictionary entries having matches above a certain threshold may be ranked or otherwise adjusted in the password dictionary sequence. In addition, the method may further include the step of providing, by the client system, a predetermined threshold in which to determine whether a password is weak (e.g., a password is deemed week if has been matched more than 0.0001% of all attempted matches). The ability to set this threshold permits the client system to selectively determine and adjust what it determines to be a safe password. In addition, as the password dictionary may increase in size over time, the fact that an entry matches a hashed value does not necessarily mean that such a password is weak.

The user names and hashed passwords that were removed during pre-processing, at step 310, are reintroduced at step 350, and finally, at step 355, the results regarding the passwords matching dictionary entries as well as the user names and hashed passwords that were removed during pre-processing are provided to a client system (or a module associated with an administrator of the client system). The results may contain data regarding the number of detected matches to permit the client system to determine whether a certain password presents any security risks, or the results may identify those passwords identified as vulnerable to unauthorized access (based on factors such as frequency of matches or other determinations).

The password dictionary is preferably stored within a database and may be generated using terms within a standard dictionary as well as with terms from other sources. For example, the password dictionary may be populated with terms (or variations thereof such as reverse spelling, terms interdigitated with asterisks, etc.) such as user/account names, character sequences, foreign language words, names of places, common last names, common male and female first names, uncommon first names, characters in myths and legends, Shakespearean references, sports terms, science fiction terms, movies and actors, cartoons, celebrities, phrases and patterns, biological terms, religious references, machine names, mnemonics, celestial objects, etc.

In addition, the password dictionary may also be populated with information pertaining to each user prior to the creation of hashed values for each user name/dictionary entry combination, such as mother's maiden name, date of birth, anniversary date, place of birth, etc. Such an arrangement requires that additional information regarding each user is provided when the user name and hashed passwords are extracted, or in the alternative, that a pool of background information regarding all of the users is provided when the user names are extracted or otherwise acquired and that the password dictionary contains background information for all of the users (rather than for a particular user).

The technique of the current invention may be used for multiple client systems.

After the analysis of each client system, the password dictionary is readjusted or ranked to reflect the aggregate number of matches for certain passwords for all of the client systems. For example, Table 1 illustrates the sequence of entries within the password dictionary, the password, and the number of matches after analyzing a client system. As provided in Table 2, the password dictionary entries may be ranked in order based on the number of matches so that those entries having the highest number of matches are given lower numbered sequences within the dictionary entry.

TABLE 1

(Password Dictionary Prior to Adjustment)

| Sequence | Password | Number of Matches |
|---|---|---|
| 1 | best-run1 | 2 |
| 2 | 2S0A0P4 | 1 |
| 3 | Walldorf2004 | 5 |
| 4 | SxxAxxP | 3 |
| 5 | No1enterprise | 0 |

TABLE 2

(Password Dictionary Subsequent to Adjustment)

| Sequence | Password | Number of Matches |
|---|---|---|
| 1 | Walldorf2004 | 5 |
| 2 | SxxAxxP | 3 |
| 3 | best-run1 | 2 |
| 4 | 2S0A0P4 | 1 |
| 5 | No1enterprise | 0 |

The skilled artisan will appreciate that the sequence of dictionary entries may be adjusted after each match is detected (rather than after the technique has processed all of the user names for a certain client system). This arrangement is beneficial in that it provides a technique for modeling human behavior (i.e., the likelihood that certain passwords be selected) to provide an evaluation method that requires fewer computing resources as compared to other password evaluation methods that simply scroll through a fixed list of password dictionary entries. In other words, as passwords that are more likely to be used, based on past data, are first analyzed to determine whether a match occurs, fewer iterations need to be conducted (and lesser computing resources are required) in order to find a match (if one is present). In addition, the analysis of multiple client systems, if conducted by a secure and trusted service provider, could also be used to generate a new password dictionary comprised of commonly used passwords from multiple client systems, however, the preferred dictionary is composed of arbitrary terms selected from different areas of life (and the technique described herein acts to optimize the dictionary).

Figure 4:
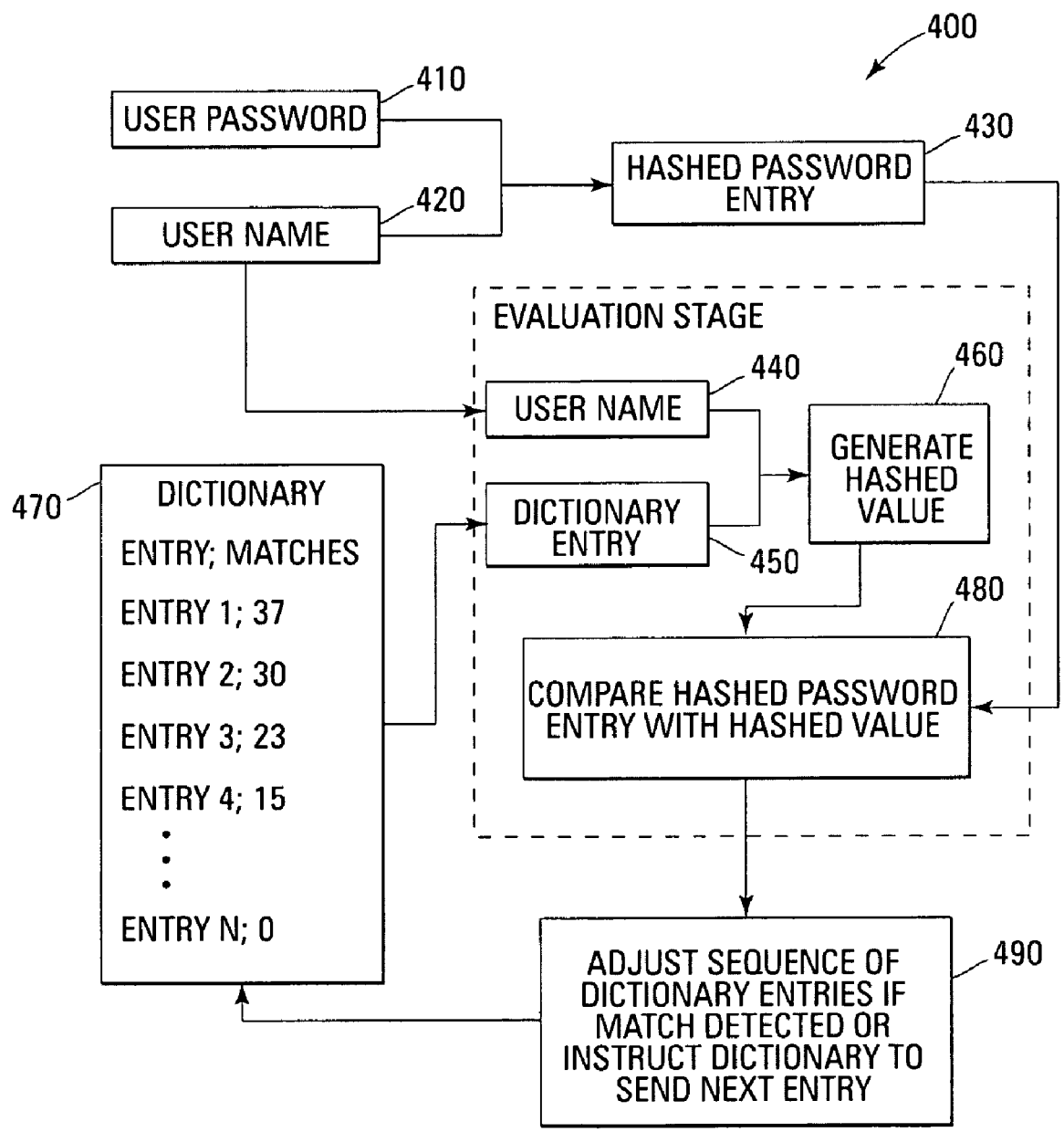
FIG. 4 is a data flow diagram of an example useful for understanding and implementing the invention.

FIG. 4 illustrates a sample data flow 400 useful for understanding and implementing the invention. In the data flow 400, a hashing procedure is used to generate hashed password data. Moreover, the user name is included in the hashing. In other implementations, the data flow 400 can be used with another security procedure or the user name may be omitted upon generating the password information.

User password 410 data and user name 420 data are both used to generate a hashed password entry 430 (which typically occurs at the client system or via a component associated therewith). The user name 420 data is provided in a manner 440 such that it is used in combination with a dictionary entry 450 from a password dictionary 470 to generate a hashed value 460. This hashed value 460 is compared 480 with the hashed password entry 430. If a match occurs, then the sequence of dictionary entries may be adjusted 490 (although this adjustment may occur at periodic intervals or after the completion of the analysis of a set of user passwords 410 and user names 420 for a particular client system). If a match does not occur then the next subsequent dictionary entry 450 is obtained from the dictionary 470 for combination with the provided user name 440 to generate a new hashed value 460. This process continues until a match occurs or the dictionary 470 entries are exhausted.

Figure 5:
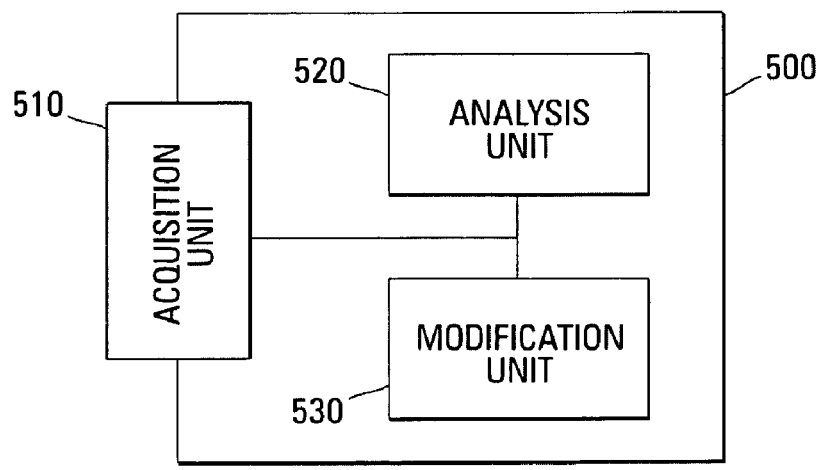
FIG. 5 is a schematic diagram illustrating an apparatus embodiment of the current invention.

With reference to FIG. 5, an apparatus 500 for evaluating computer system passwords is illustrated. The apparatus 500 includes an acquisition unit 510 that obtains, for each user of a client system, password information generated by performing a security procedure on a password entry. In this example, the acquisition unit 510 obtains a user name and corresponding hashed password entries for each user of a client (computer) system. The acquisition unit may extract the user names and hashed password entries from a client system, or it may, in the alternative, receive user names and hashed password entries via a computer network or via a computer storage medium (e.g., CD-ROM).

The apparatus 500 includes an analysis unit 520 that is coupled to the acquisition unit 510. The analysis unit sequentially performs, for each user name, the security procedure on sequenced entries of a dictionary until either a match with the password information is detected or the sequenced entries are exhausted. In this example, the analysis unit sequentially generates, for each user name, a hashed value combining the user name with sequenced entries in a password dictionary until either a hashed value matching the hashed password entry is detected or the dictionary entries are exhausted. The analysis unit 520 may also conduct other steps described above in connection with the method embodiment 200 and the exemplary process flow diagram 300.

The apparatus 500 includes a modification unit 530 coupled to the analysis unit. The modification unit adjusts the sequence of a sequenced entry in the dictionary based on the number of matches detected for the sequenced entry. In this example, the modification unit adjusts the sequence of a dictionary entry in the dictionary based on the number of detected matched hashed values associated with the dictionary entry. Preferably, this sequence adjustment is conducted after several user names and hashed password entries are analyzed by the analysis unit 510, however, it will be appreciated that the sequence readjustment may occur after each successful match.

The current invention may also be coupled to or used in connection with an accounting system that determines how many user name and hashed passwords are detected, and that a client system or user associated therewith is charged for each user name/hashed password analyzed, or alternatively, for each user name/hashed password combination that is determined to constitute a weak password. Particularly, an embodiment may calculate the number of password entries for which matches have been detected, and generate an invoice based on the calculated number of password entries. In other implementations, the apparatus 500 can be used with another security procedure or the user name may be omitted upon generating the password information.

While the present invention has been described with respect to particular embodiments (including certain system arrangements and certain orders of steps within various methods), those skilled in the art will recognize that the current invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. A system for evaluating passwords for a plurality of users of a computer system, the system comprising:
   a computer system including:
      a login database for storing a user name and corresponding password information for each of a plurality of users, the password information being generated by performing a security procedure on a password entry;
      a first data acquisition interface for receiving the user name and the password entry from the plurality of users; and
      a security module coupled to the login database and the first data acquisition interface for performing the security procedure on the received password entry and providing access to the computer system if the generated password information matches the password information in the login database; and
   a password evaluation component including:
      a second data acquisition interface for obtaining the password information for each user of the computer system;
      a database including a dictionary having sequenced entries;
      an analysis module coupled to the second data acquisition interface and the database for sequentially performing, for each user, the security procedure on the sequenced entries until either a match with the user's password information is detected or the sequenced entries are exhausted;
      wherein the password evaluation component stores in the database, for each of the sequenced entries, data associated with the number of matches detected for the sequenced entry; and
      wherein the password evaluation component adjusts the sequence of entries in the dictionary based on the number of matches detected for each sequenced entry.

2. The system of claim 1, wherein the password evaluation component further comprises a pre-screening module for comparing the password information of the plurality of users to determine if there is at least one duplicate and for excluding the at least one duplicate from the sequential performance of the security procedure by the analysis module.

3. The system of claim 1, wherein the password evaluation component further comprises an accounting unit for calculating the number of matches detected, and for generating an invoice based on the number of matches detected.

4. The system of claim 1, wherein the security procedure generates the password information by hashing at least the password entry.

5. The system of claim 1, wherein the analysis module determines that a password entry is not secure based on whether a match with the user's password information is detected and the number of matches detected for the sequenced entry.

6. The system of claim 5, wherein the analysis module determines that a password is not secure if the number of matches detected for the sequenced entry is above a predetermined sequence threshold.

7. The system of claim 1, wherein the password evaluation module ranks the sequenced entries in the dictionary based on the number of matches detected for each sequenced entry.

8. The system of claim 7, wherein only sequenced entries having a number of matches above a predetermined threshold are ranked.

9. A method for evaluating computer system passwords, the method comprising:
   obtaining, for each user of a computer system, password information generated by performing a security procedure on a password entry;
   sequentially performing, for each user, the security procedure on sequenced entries of a dictionary until either a match with the password information is detected or the sequenced entries are exhausted; and
   adjusting the sequence of a sequenced entry in the dictionary based on the number of matches detected for the sequenced entry.

10. The method of claim 9, further comprising:
   comparing several instances of password information to determine if there are any duplicates; and
   excluding any duplicates from the step of sequentially performing the security procedure.

11. The method of claim 9, further comprising populating the dictionary with terms selected from the group comprising: user or account names, user background information, character sequences, numbers, foreign language words, names of places, common last names, common male and female first names, uncommon first names, characters in myths and legends, Shakespearean references, sports terms, science fiction terms, movies and actors, cartoons, celebrities, phrases and patterns, biological terms, machine names, religious references, mnemonics, and celestial objects.

12. The method of claim 9, further comprising:
   calculating the number of password entries for which matches have been detected; and
   generating an invoice based on the calculated number of password entries.

13. The method of claim 9, wherein the security procedure generates the password information by hashing at least the password entry.

14. The method of claim 9, wherein the password entry is determined to not be secure if the match with the password information is detected.

15. The method of claim 14, wherein the password entry is determined to not be secure if the match with the password information is detected and the sequenced entry corresponding to the password information is above a predetermined sequence threshold in the dictionary.

16. The method of claim 9, further comprising ranking the sequenced entries based on the number of matches detected for each sequenced entry.

17. The method of claim 16, wherein only sequenced entries having a number of matches above a predetermined threshold are ranked.

18. A computer program product tangibly embodied in an information carrier, the computer program product including instructions that, when executed, cause a processor to perform operations comprising:
   obtaining, for each user of a computer system, password information generated by performing a security procedure on a password entry;
   sequentially performing, for each user, the security procedure on sequenced entries of a dictionary until either a match with the password information is detected or the sequenced entries are exhausted; and
   adjusting the sequence of a sequenced entry in the dictionary based on the number of matches detected for the sequenced entry.

19. An apparatus for evaluating computer system passwords, the apparatus comprising:
   an acquisition unit obtaining, for each user of a computer system, password information generated by performing a security procedure on a password entry;
   an analysis unit sequentially performing, for each user, the security procedure on sequenced entries of a dictionary until either a match with the password information is detected or the sequenced entries are exhausted; and
   a modification unit adjusting the sequence of a sequenced entry in the dictionary based on the number of matches detected for the sequenced entry.

20. The apparatus of claim 19, wherein the apparatus determines the password entry to not be secure if the match with the password information is detected and the sequenced entry corresponding to the password information is above a predetermined sequence threshold in the dictionary.

* * * * *